Patented May 12, 1936

2,040,473

UNITED STATES PATENT OFFICE 2,040,473

AZO DYESTUFFS AND PROCESS OF PREPARING THE SAME

Robert E. Etzelmiller, Wilmington, Del., assignor to E. I. du Pont de Nemours & Company, Wilmington, Del., a corporation of Delaware No Drawing. Application July 18, 1934, Serial No. 735,821

13 Claims. (Cl. 260—95)

This invention relates to novel azo dyestuffs, and their preparation. More particularly, it relates to the preparation as insoluble pigments or directly on textile fibers of new azo dyestuffs of the general formula:

XO—CO—NH—Arylene—N=N—A in which formula X refers to an alkyl, aryl, aralkyl or hydroaryl radical which may be further substituted by radicals such as alkyl, alkoxy or halogen; "Arylene" represents an arylene nucleus, preferably of the benzene or naphthalene series, which may be further substituted by radicals such as alkyl, alkoxy, and halogen; and A represents the nucleus of an ice-color coupling component; and in which X, Arylene and A contain no carboxylic-acid, sulfonic-acid, or similar groups, which may render the new dyes soluble in water or alkalies.

It is an object of this invention to prepare novel, water-insoluble azo dyes of the so-called ice-color series. It is a further object of my invention to provide new azo dyes for textile fiber, which are capable of synthesis directly on the fiber, and which produce upon cotton colors within the ranges of green, blue, violet, Bordeaux, red, brown and black. It is a further object of my invention to provide new azo dyestuffs which employ in their synthesis the novel amino-arylurethane compounds of my copending application, Serial No. 735,819, which has matured into U. S. Patent No. 2,026,618, January 7, 1936, as intermediates. Other and further important objects of this invention will appear as the description proceeds.

By "ice color coupling-component" in this specification, I am referring to those components which are generally employed in the art for the manufacture of insoluble azo pigments or for synthesizing water-insoluble azo dyestuffs on the fiber. These components are generally selected among the following types of compounds; namely: the aryl-amides of 2,3-hydroxynaphthoic acid, the alpha- and beta-naphthols, various acylamino-naphthols, acyl - acetyl - arylamines, aryl-methyl-pyrazolones, and many related compounds as more specifically enumerated at the end of this specification. In general, they may be defined as aromatic or heterocyclic compounds which couple with diazotized arylamines but which contain no free sulfonic acid or carboxylic acid groups.

The preparation of the so-called "ice-colors" by the coupling of diazotized arylamines free from solubilizing groups with the various ice-color coupling components is a widely practiced art. It is, however, somewhat difficult to find proper diazo compounds which, when coupled to said ice-color coupling components, produce bluish-red, Bordeaux, violet and blue shades of good brightness and fastness. It is in this range of shades that the present invention is of greatest value.

I have now found that many azo dyestuffs of the general formula above set forth, possess colors within the desired range, and are further possessed of good brightness and sufficient fastness qualities to render them of great commercial interest.

My new dyestuffs may be prepared by a variety of ways as will be readily understood, all of which involve essentially the steps of diazotizing an arylamine of the general formula

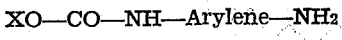

XO—CO—NH—Arylene—NH$_2$ in which X and "Arylene" have the same significance as above, and coupling eventually the diazo compound thus produced to an ice-color coupling component.

Where the dyestuff is desired in substance, the coupling may be effected directly in aqueous solution or suspension, under neutral, acid, or alkaline conditions, as the case may be, depending on the component. In this case an insoluble pigment is obtained.

Where, however, it is desired to dye textile fiber, the dyestuff is synthesized directly on the fiber in accordance with customary procedure. Here a choice of several methods is available:

1. Textile fiber may be padded with the ice-color coupling component, in accordance with methods well-known in the art, then immersed in a diazo solution prepared from an arylamine of the above formula, resulting in the preparation of the new color on the fiber.

2. Textile fiber may be padded with the coupling component, then printed with a paste containing the diazo-salt prepared from an arylamine of the above formula, resulting in the development of the printed patterns with the new dye.

3. The arylamine may be diazotized and converted to a soluble derivative, stable and nonreactive toward the ice-color coupling component under alkaline conditions, but capable of being hydrolyzed to the parent diazo-salt upon treatment with acid at ordinary or elevated temperature. A printing composition is prepared comprising the diazo-derivative, ice-color coupling component, alkali and the usual thickener and assistants. The textile fiber is printed with this paste. The printed material is then treated with a mild acidic reagent under proper conditions of temperature, resulting in the production of the new dye, in substance, according to the printed pattern.

The new dyes and processes for their preparation will be more thoroughly understood by reference to the following examples, but it is to be understood that the present application is not limited thereto. All quantities are stated in parts by weight.

*Example I*

25.4 parts of N-(4-amino-2,5-diethoxy-phenyl)-methyl-carbamate (Example 9 of copending application, Serial No. 735,819) are stirred in 30 parts of a 30% hydrochloric acid solution, and 350 parts of cold water, and diazotized with 7 parts of sodium nitrite dissolved in 30 parts of water. When the diazotization is complete, the solution is filtered to remove solid impurities, and the mineral acidity thereof is neutralized with sodium carbonate.

In a separate container, cotton skeins are impregnated in the usual manner with the anilide of 2,3-hydroxy-naphthoic acid, and developed with the above prepared neutral diazo-bath. When the development of the color is complete, the skeins are rinsed, soaped at the boil, again rinsed and dried.

The cotton is dyed a bright blue shade of good fastness to washing and to light. The composition of the color upon the fiber is most probably represented by the following formula:

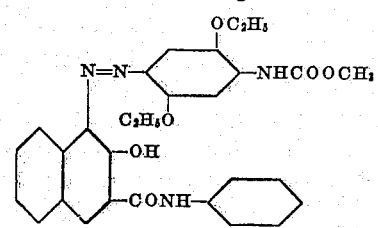

*Example II*

16.6 parts of N-(4-aminophenyl)-methyl-carbamate are stirred with 30 parts of 30% hydrochloric acid solution and 350 parts of cold water, and the base diazotized with 7 parts of sodium nitrite dissolved in 30 parts of water. When the diazotization is complete, the solution is filtered, and the mineral acidity of the filtrate is neutralized with sodium acetate.

Cotton skeins, impregnated in the usual manner with the beta-naphthalide of 2,3-hydroxy-naphthoic-acid, are developed in the above diazo solution. When the development of the color is complete, the skeins are rinsed, soaped at the boil, rinsed and dried.

The cotton is dyed a red-Bordeaux shade of good fastness to washing and to light. The constitution of the color on the fiber is most probably represented by the following formula:

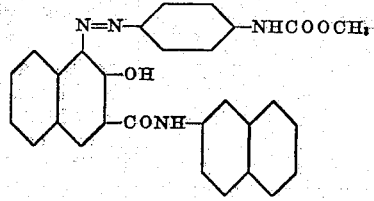

*Example III*

Cotton skeins, padded in the usual manner with the p-anisidide of 2,3-hydroxy-naphthoic-acid, are developed in a diazo-bath prepared from 16.6 parts of N-(3-aminophenyl)-methyl-carbamate by the method given in Example II. After the development, and the rinsing and soaping of the skeins, a bright scarlet dyeing of good fastness to light and washing is obtained. The dye has most probably the structure:

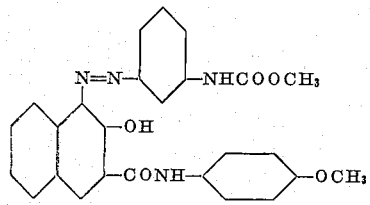

*Example IV*

Cotton skeins, impregnated in the usual manner with the p-anisidide of 7-hydroxy-1-naphtho-carbazole-6-carboxylic-acid, are developed in a diazo-bath prepared as follows:

180 parts of N-(5-amino-2-methyl-phenyl)-methyl-carbamate are stirred with 30 parts of 30% hydrochloric acid and 350 parts of cold water, and diazotized with 7 parts of sodium nitrite dissolved in 30 parts of water. When the diazotization is complete, the solution is filtered and its mineral acidity neutralized with sodium acetate.

When the development of the color in the above bath is complete, the skeins are rinsed, soaped at the boil, rinsed and dried. By this process a violet dyeing of good fastness to washing and light is obtained. The dye has the probable formula:

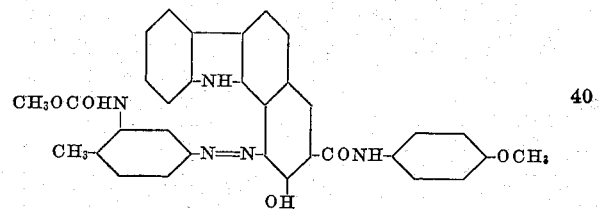

*Example V*

Cotton skeins, padded in the usual manner with diaceto-acetyl-o-tolidine, are developed in a diazo-bath prepared as in Example IV: After the development, and the rinsing and soaping of the skeins, a bright yellow dyeing of good fastness to washing and of fair fastness to light is obtained. The dye has probably the following formula:

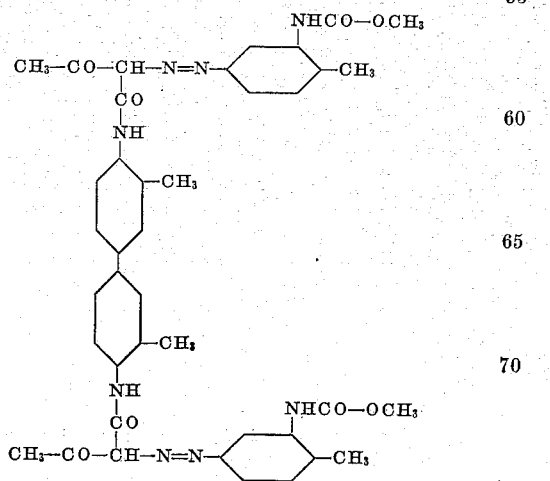

Example VI

Cotton skeins, padded in the usual manner with the p-chlor-anilide of 2-hydroxy-carbazole-3-carboxylic-acid are developed in a diazo-bath prepared as follows:

19.6 parts of N-(5-amino-2-methoxy-phenyl)-methyl-carbamate (Example I of copending application, Serial No. 735,819), are stirred with 30 parts of 30% hydrochloric acid and 350 parts of cold water, and diazotized with 7 parts of sodium nitrite dissolved in 30 parts of water. When the diazotization is complete, the solution is filtered and its mineral acidity neutralized with sodium carbonate.

When the development of the color in the above bath is complete, the skeins are rinsed, soaped at the boil, rinsed and dried. By this process a brown dyeing of good fastness to washing and light is obtained. The dye has the probable formula:

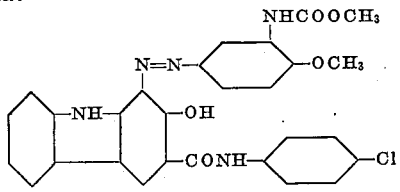

Example VII

Cotton skeins, padded in the usual manner with the beta-naphthalide of 2,3-hydroxy-naphthoic acid, are developed in a diazo-bath prepared from 20.05 parts of N-(5-amino-2-chloro-phenyl)-methyl-carbamate by the method given in Example I. After the development, and the rinsing and soaping of the skeins, a scarlet dyeing of good fastness to washing and fair fastness to light is obtained. The dye has the following formula:

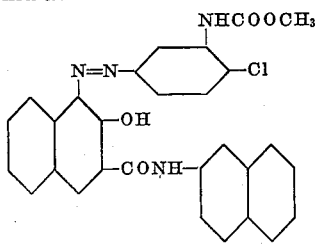

Example VIII

Cotton skeins, padded in the usual manner with the o-toluidide of 2,3-hydroxy-naphthoic-acid, are developed in a diazo-bath prepared from 21.0 parts of N-(4-amino-5-methyl-2-methoxy-phenyl)-methyl-carbamate (Example III of copending application, Serial No. 735,819), by the method given in Example I. After the development, and the rinsing and soaping of the skeins, a violet dyeing of good fastness to washing and light is obtained. The dye has the formula:

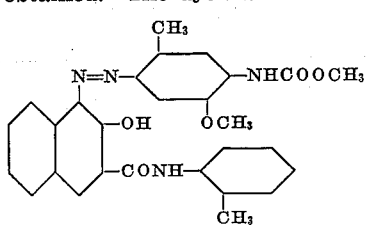

Example IX

Cotton skeins, padded in the usual manner with the o-toluidide of 2,3-hydroxy-naphthoic-acid, are developed in a diazo-bath prepared from 28.2 parts of N-(4-amino-2,5-diethoxy-phenyl)-β-methoxy-urethane (Example V of copending application, Serial No. 735,819) by the method given in Example I. After the development, and the rinsing and soaping of the skeins, a blue dyeing of good fastness to washing and to light is obtained. The dye has probably the formula:

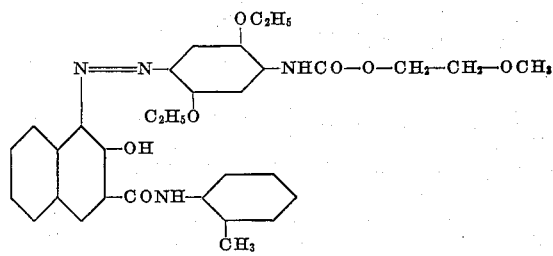

Example X

Cotton skeins, padded in the usual manner with the anilide of 2,3-hydroxy-naphthoic acid, are developed in a diazo-bath prepared from 29.6 parts of N-(4-amino-2,5-diethoxy-phenyl)-n-butyl-carbamate (Example VI of copending application, Serial No. 735,819) by the method given in Example I. After the development, rinsing and soaping of the skeins, a reddish-blue dyeing of good fastness to washing and light is obtained. The dye has the probable formula:

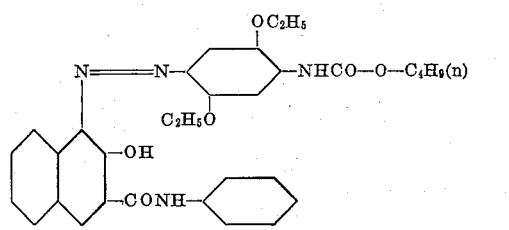

Example XI

Cotton skeins, padded in the usual manner with the β-naphthalide of 2,3-hydroxy-naphthoic-acid, are developed in a diazo-bath prepared from 33.0 parts of N-(4-amino-2,5-diethoxy-phenyl)-benzyl-carbamate (Example VIII of copending application, Serial No. 735,819) by the method given in Example I. After the development, rinsing and soaping of the skeins, a navy blue dyeing of good fastness to washing and light is obtained. The dye has the probable formula:

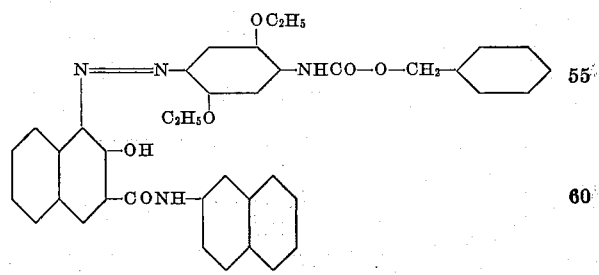

Example XII

A solution of the o-toluidide of 2,3-hydroxy-naphthoic-acid is prepared by stirring 10 parts of the toluidide with 5 parts of alcohol, adding 25 parts of sodium hydroxide of 25 percent strength and 500 parts of water. A diazo-solution prepared from N-(4-amino-2,5-diethoxy-phenyl)-methyl-carbamate is prepared as in Example I. An equivalent quantity of the diazo solution is added to the solution of the toluidide above described. Reaction takes place and an insoluble pigment is formed, possessing most probably the following constitution:

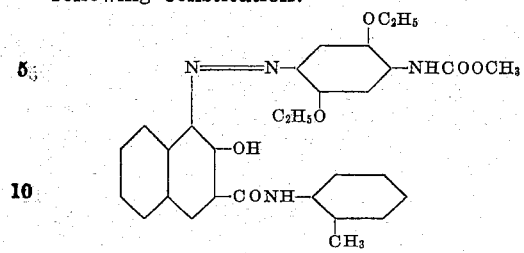

The pigment is filtered, washed and dried. It forms a dark blue powder, which dissolves in concentrated sulfuric acid to a bright blue solution.

In a similar manner any of the other dyestuffs described in the above examples may be synthesized in substance to produce a pigment.

*Example XIII*

25.4 parts of N-(4-amino-2,5-diethoxyphenyl)-methyl-carbamate are stirred in 30 parts of 30% hydrochloric acid and 150 parts of cold water and diazotized with 7 parts of sodium nitrite dissolved in 20 parts of water. When the diazotization is complete the solution is filtered.

15 parts of piperidine-alpha-carboxylic-acid are dissolved in 50 parts of water containing 10 parts of sodium carbonate solution. The diazo-solution is added to the piperidine-alpha-carboxylic-acid solution, followed by sufficient sodium carbonate solution to render the mass alkaline to brilliant yellow papers. A stable diazoimino compound of the probable constitution:

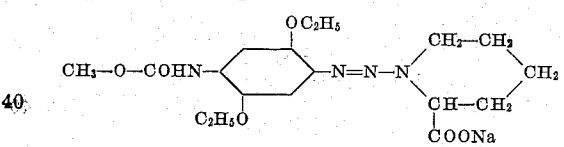

is thus produced. The product is isolated by salting the mixture and separating the oily layer which forms. It is dried under reduced pressure. It may be purified to remove inorganic salts by extraction with alcohol, filtration, and removal of the alcohol by evaporation.

A printing paste is prepared according to the following formula:

| | Parts |
|---|---|
| The diazoimino compound above described | 8.3 |
| The anilide of 2:3-hydroxy-naphthoic-acid | 5.5 |
| Turkey red oil | 3.0 |
| Caustic soda solution of 30 percent strength | 5.0 |
| Starch-tragacanth thickener | 67.0 |
| Water heated to 160° F | 11.2 |
| Total | 100.0 |

Cotton piece goods are printed from an engraved copper roll with the above paste. The printed fabric is then subjected to the action of saturated steam containing the vapors of acetic acid, at a temperature of about 212° F. Rapid development of the pattern to a bright blue dyeing results, due to the formation on the fiber of the dye of the formula given in Example I. The fabric is rinsed, soaped, again rinsed and dried. The printed pattern shows good fastness to light and washing.

It will be readily understood that other secondary amines containing water-solubilizing groups may be used in preparing the diazoimino compound suitable for use in the above printing process.

Following is a list of a few representative amines which may be substituted for piperidine-alpha-carboxylic-acid, together with the probable formula of the resulting diazoimino compound:

| Amine | Diazoimine |
|---|---|
| $CH_3NHCH_2—COOH$<br><br>Sarcosine | $\begin{array}{c}CH_3\\ \diagdown\\ N—N=N—\langle\rangle—NHCOOCH_3\\ \diagup\\ NaOOC—CH_2\end{array}$ with $OC_2H_5$ and $C_2H_5O$ on ring |
| $CH_3—CH_2—NH—CH_2—CH_2—SO_3H$<br><br>Ethyl-taurine | $\begin{array}{c}CH_3—CH_2\\ \diagdown\\ N—N=N—\langle\rangle—NHCOOCH_3\\ \diagup\\ NaO_3S—CH_2—CH_2\end{array}$ with $OC_2H_5$ and $C_2H_5O$ on ring |
| $\begin{array}{c}CH_2—\!\!—CH_2\\ \vert\qquad\quad\vert\\ CH_2\quad CH—COOH\\ \diagdown\diagup\\ NH\end{array}$<br><br>Proline | $\begin{array}{c}CH_2—CH_2\\ \vert\qquad\vert\\ CH_2—CH\quad COONa\\ \end{array}$ N—N=N—ring—NHCOOCH$_3$ with $OC_2H_5$, $C_2H_5O$ |
| $CH_2—OH$<br>$(CHOH)_4$<br>$CH_2$<br>$NH—CH_3$<br><br>Methyl-glucamine | $\begin{array}{c}CH_2OH(CHOH)_4—CH_2\\ \diagdown\\ N—N=N—\langle\rangle—NHCOOCH_3\\ \diagup\\ CH_3\end{array}$ with $OC_2H_5$, $C_2H_5O$ |

These diazoimino compounds are all equivalent for the purpose of this invention. When made up into a printing paste with the anilide of 2,3-hydroxy-naphthoic-acid, printed on the fiber, and developed by the action of acid and heat, they result in the formation on the fiber of the same new dye, of the formula given in Example No. I.

It will be clear that the above examples describe only a few of the large number of new dyes which may be prepared according to the present invention. Practically any arylamine of the general formula X—CO—NH—Arylene—NH₂, as above defined, may be used for forming the diazo compound. Particularly desirable shades are obtained by the use of those arylamines in which the "Arylene" radical is of the benzene or naphthalene series, and carries at least one alkoxy group. A great number of these arylamines is described in my copending application, Serial No. 735,819.

For example, to mention a few of the possibilities, the "X" portion of the molecule may be
  Methyl, ethyl, propyl, iso-propyl, etc.
  β-methoxy-ethyl
  β-chloro-ethyl
  Cyclohexyl, methyl-cyclohexyl, etc.
  Benzyl, or various substituted benzyl radicals
  Phenyl, or various substituted aryl radicals Similarly, the "Arylene" radical may represent meta- or para-phenylene radicals which may be further substituted by methyl or other alkyl groups, by methoxy or other alkoxy groups, by phenyl or other aryl groups, by halogens, by phenoxy or other aryloxy groups; or it may represent any one of the various naphthylene radicals, which again may be substituted by alkyl, alkoxyl, aryl, aryloxy or halogen radicals.

As previously stated, all of the various types of ice-color coupling components generally known in the art, are suitable for use in the preparation of the new dyes. Among them, these coupling components include:

The arylamides of various hydroxy-aryl-carboxylic-acids, such as
  2-hydroxy-naphthalene-3-carboxylic-acid
  2-hydroxy-carbazole-3-carboxylic-acid
  2-hydroxy-anthracene-3-carboxylic-acid
  alkyl, alkoxy, alkylamino, and arylamino derivatives of 2-hydroxy-naphthalene-3-carboxylic acid.

These arylamides may be those obtainable from aniline, the toluidines, alkoxy- and aryloxyanilines, halogenated anilines, halogenated toluidines, halogenated alkoxy- and aryloxyanilines, trifluoromethyl-anilines, dianisidine, α- and β-naphthylamine, and so forth.

Various acylamino-naphthols, such as 1-benzoylamino-7-naphthol, 2-toluylamino-3-naphthol, 1-(2'-chlorobenzoylamino)-5-naphthol, and so forth.

Alpha- and beta-naphthol.

Acyl-acetyl-derivatives of arylamines and arylene-diamines, such as benzoylacetanilide, diaceto-acetyl-tolidine, and so forth.

Aryl-methyl-pyrazolones, such as 1-phenyl-3-methyl-5-pyrazolone.

Dihydroxy-quinolines.

By a proper selection of arylamine and of coupling component, practically any shade may be produced. Yellows, scarlets, reds, Bordeaux, violets, blues, greens, browns, and blacks may be obtained according to the combination selected; and in many instances the colors show excellent fastness such as to light, washing, kier-boiling, and chlorine.

The new dyes and processes resulting from the present invention make possible the dyeing and printing of textile fibers to bright shades of good fastness properties, and particularly makes possible the preparation of violet and blue dyeings of desirable properties. Further, new azo pigments of desirable color and properties may be prepared according to the present invention.

It will be understood that many other variations and modifications are possible in my preferred modes of procedure, without departing from the spirit of this invention.

I claim:
1. Azo dyestuffs of the general formula

XO—CO—NH—Arylene—N=N—A wherein X stands for an alkyl, aryl, aralkyl or hydroaryl radical, "Arylene" represents an arylene nucleus of the benzene or naphthalene series; and A represents the nucleus of an ice-color coupling component of the ortho-hydroxy-arylcarboxylic-acid-arylamide series; and in which X, Arylene and A contain no carboxylic or sulfonic acid groups.

2. An azo dyestuff of the general formula

XO—CO—NH—Phenylene—N=N—A, in which formula X stands for an aliphatic radical; "Phenylene" represents a phenylene nucleus selected from the group consisting of the unsubstituted phenylene radical, its homologs, alkoxy substitution derivatives and halogen substitution derivatives thereof; and A constitutes the nucleus of an arylamide of an ortho-hydroxy-carboxylic acid.

3. An azo dyestuff of the general formula

XO—CO—NH—Phenylene—N=N—A, in which formula X stands for an aliphatic radical; "Phenylene" represents a phenylene nucleus selected from the group consisting of the unsubstituted phenylene radical, its homologs, alkoxy substitution derivatives and halogen substitution derivatives thereof; and A constitutes the nucleus of an arylamide of 2,3-hydroxy-naphthoic acid.

4. An azo dyestuff of the general formula

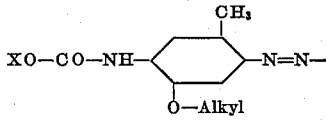

wherein X stands for an aliphatic radical, while A stands for the nucleus of a 2,3-hydroxy-naphthoic acid-arylide.

5. The azo dyestuff of the formula

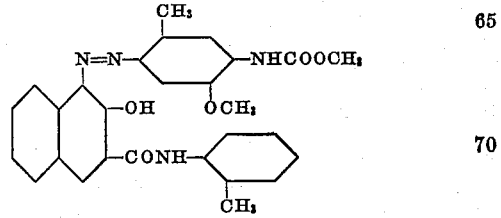

which dyestuff, when synthesized on cotton fiber, produces a violet color.

6. An azo dyestuff of the general formula

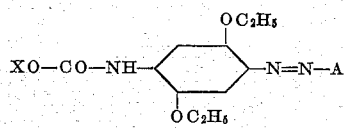

wherein X stands for an aliphatic radical, while A stands for the nucleus of a 2,3-hydroxy-naphthoic acid-arylide.

7. The azo dyestuff of the formula

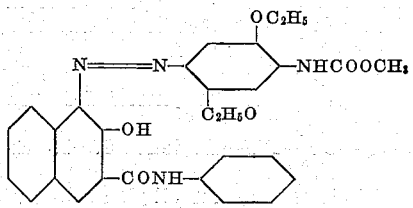

which dyestuff, when synthesized upon cotton fiber produces a blue dyestuff.

8. The process of producing an azo color, which comprises coupling a diazotized arylamine of the general formula XO—CO—NH—Arylene—$NH_2$, in which formula X stands for an alkyl, aryl, aralkyl or hydroaryl radical, and "Arylene" represents an arylene nucleus of the benzene or naphthalene series, with an ice color coupling component of the ortho-hydroxy-aryl-carboxylic-acid-aryl amide series.

9. The process of producing an azo color, which comprises coupling a diazotized arylamine of the general formula

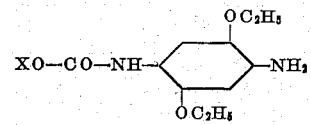

wherein X stands for an aliphatic radical, with an arylide of 2,3-hydroxy-naphthoic acid.

10. Textile fiber dyed with a dyestuff as defined in claim 1.

11. Textile fiber dyed with a dyestuff as defined in claim 2.

12. Textile fiber dyed with a dyestuff as defined in claim 3.

13. Textile fiber dyed with a dyestuff as defined in claim 7.

ROBERT E. ETZELMILLER.